Dec. 25, 1956    C. H. FLUBACKER    2,775,680
ICE DETECTION SYSTEM
Filed Jan. 8, 1953
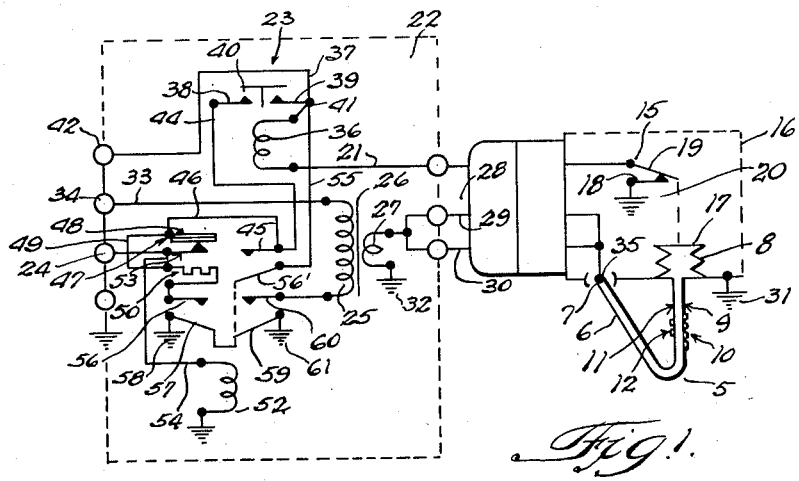
Fig. 1.
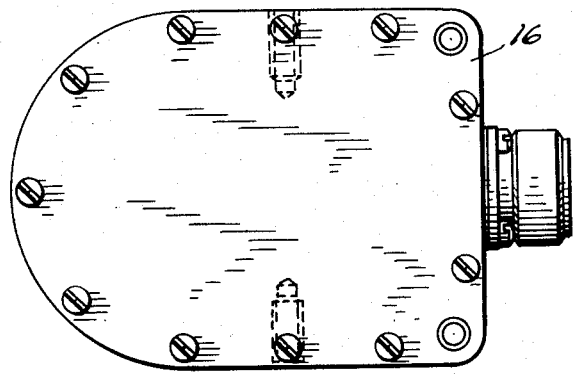
Fig. 2.
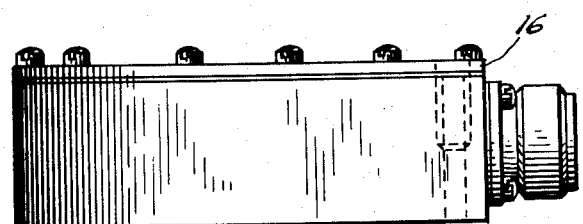
Fig. 3.
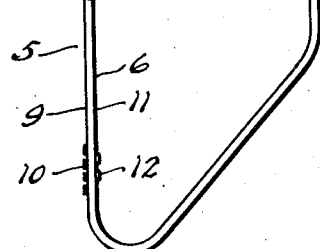
INVENTOR.
Charles H. Flubacker.
BY
Thiess, Olson & Mecklenburger.
Attys United States Patent Office 2,775,680
Patented Dec. 25, 1956

2,775,680

ICE DETECTION SYSTEM

Charles H. Flubacker, Chicago, Ill., assignor to Cook Electric Company, Chicago, Ill., a corporation of Illinois Application January 8, 1953, Serial No. 330,316

15 Claims. (Cl. 219—20)

This invention relates to an ice detecting system and, more particularly, to a system or apparatus for detecting the formation of ice upon moving vehicles such as airplanes or the like.

The invention is directed to such a system or apparatus capable of accurate operation over long periods of time and under a wide range of climatic conditions.

An object of the invention is to provide an ice detecting system or apparatus which will, under all conditions normally encountered in use, provide indications sufficiently in advance of engine performance impairment to allow corrective measures to be taken either manually or automatically to prevent loss of performance below engine anti-icing specifications.

Another object of the invention is to provide an ice detecting system or apparatus which is noncritical in location and rugged, requires low power drain on the aircraft or vehicle power system, and is adaptable to easy production.

A still further object of the invention is to provide a reliable ice detecting system which will operate satisfactorily for use in any application where the air velocity is normally sufficient to create impact pressures above the setting of a differential pressure switch.

The invention in one of its more specific aspects resides in the use of a probe or the like wherein an impact pressure proportional to the air velocity is created and vented to the diaphragm of the differential pressure switch. The formation of ice upon the probe is relied upon to cause failure of the impact pressure and an immediate operation of the differential pressure switch whereby a signal is created and a heating circuit is operated to clear the ice from the probe and to indicate thereby a continuing icing condition, if such should exist, so that corrective measures may be taken to prevent loss of performance below engine anti-icing conditions.

Apparatus of this type may include a probe having a greater perforated area along its leading edge than along its trailing edge and an expansible diaphragm adapted to be actuated by impact pressure created by air flow whereby a condition of no air flow caused by an icing condition closing off the perforations in the leading edge of the probe can be immediately utilized through the expansible diaphragm to indicate this icing condition and the need to resort to corrective measures before impairment of engine performance.

Specifically, a control circuit may be actuated by the action of the diaphragm of the differential pressure switch upon failure of impact pressure whereby to close a heating circuit that may include the probe itself so that heat created by the current flow through the heating circuit may be used to melt the ice upon the probe to clear the perforations along its leading edge.

A still further object of the invention is to provide recycling means for effecting fixed deicing periods to assure thorough deicing of the probe on each cycle of operation. It has been found that partial melting of the ice on the probe may uncover the holes sufficiently to increase the pressure to true impact pressure actuating the diaphragm and opening the heating circuit before the probe has been completely deiced. By employing means that definitely fixes the deicing period and then recycles the system so that the heating circuit automatically becomes energized at predetermined intervals for predetermined periods as long as the icing condition continues, an indication of the true icing condition can be obtained.

Further objects and advantages of the invention will be apparent from the following description when taken in connection with the accompanying drawings which form a part hereof.

In the drawings:

Figure 1 is a side view of apparatus embodying the invention;

Fig. 2 is an elevation of the rear cover of the apparatus; and

Fig. 3 is a wiring diagram of the invention.

The apparatus disclosed herein comprises a probe 5 in the form of a thin walled tubing 6 sealed at end 7 and communicating at the other end with a flexible wall 8. Flexible wall 8 is in the form of a diaphragm adapted to respond to pressure changes in tubing 6. Lead wall 9 is provided with a perforated area 10 while the trailing wall 11 of the probe is provided with a smaller perforated area 12. In view of the fact that the lead wall 9 has a greater perforated area, air flow past the probe will create an impact pressure in the probe that is proportionate to the air velocity. For a given air velocity, restriction of the perforated area 10 by ice will therefore reduce the impact pressure that is vented to diaphragm 8.

A differential pressure switch 15, which in its entirety includes diaphragm 8, is disposed in a pressure-proof housing 16. To prevent the possibility of impact pressure being trapped by extremely heavy icing conditions, a relatively small opening 17 is provided between the impact and static chambers to equalize pressure on diaphragm 8 when there is no flow. Electrical contacts 18 and 19 of switch 15 are arranged to remain closed when diaphragm 8 is in contracted position, but the presence of impact pressure in probe 5 expands this diaphragm to open these contacts. Contact 18 may be connected to ground as shown in Fig. 1, and contact 19 may be connected to wire 21 of a control circuit 22 which has a relay 23 provided with two sets of normally open contacts, one set being in series with an indicator circuit 24 and the other set being in series with the primary 25 of a transformer 26.

While any suitable type of transformer may be used, a transformer is suggested that is designed to reduce, say, 115 v. A. C. 400 cycle voltage to 3 volts A. C. at the secondary 27. Secondary 27 is in a heating circuit 28 comprising wires 29 and 30 which connect at 35 to probe 5, the housing 16 being grounded at 31 and one leg of the secondary coil being grounded at 32. This heating circuit includes probe 5, which, as previously stated, may be a thin-walled metal tube so that the heat generated from the current flow through this wall will heat the same sufficiently to cause ice, that has formed on the lead surface 9, to melt and free the perforations 10 to air flow. Primary 25 may be connected at one side of wire 33 and to current supply terminal at 34.

Control relay 23 has its winding 36 connected to wire 21 and to a low voltage supply line 37 leading from line terminal 42. Contacts 38 and 39 are adapted to be closed by movable contact 40 carried or movable by the core of relay 23. Contact 39 is also connected to supply line 37 and to winding 36, say, at 41 or in any other suitable way. Opposite contact 38 connects to wire 44 leading to contact 45. Also connected to wire 44 is a wire 46 connected at 47 to a bimetallic thermal element 48 and to a wire 49, which connects to a resistance 50 adapted to be so located with respect to thermal element 48 that the latter will break the circuit at contact 53 after a predetermined time interval from the actuation of control relay 23 and the closing of the circuit at contact 38. Current will not flow through resistance 50, however, until a cycling relay 52 is energized by current flowing first through control relay 23, wires 44 and 46, thermal element 48, a contact 53, and a wire 54. When cycling relay 52 is energized, a holding circuit therefor is established by means of a wire 55, a movable contact 56' engaging contact 45, wire 46, thermal element 48, contact 53 and wire 54. With cycling relay 52 energized, the circuit to resistance 50 is also completed through a fixed contact 56 and a movable contact 57 grounded at 58. Also, the circuit of the primary coil 25 of transformer 26 is completed by a movable contact 59 grounded at 61 engaging a fixed contact 60.

It will be observed from this description that the holding circuit will remain closed to keep cycling relay 52 energized as long as thermal element 48 is not sufficiently flexed to break the circuit at contact 53. This condition is controlled by the period of time current is allowed to flow through resistance coil 50, although the circuit of the differential pressure circuit 15 might be opened by expansion of diaphragm 8 as the result of impact pressure building up in probe 5 from the melting of enough of the ice formation on the perforated area 10 of lead surface 9 to cause the air velocity to build up this impact pressure.

It will be apparent that this impact pressure will build up more quickly with less of the perforated area deiced at higher air velocities than at lower air pressures. If adequate deicing is not permitted on each recycling, it has been found that an ice formation can result which will be too great to deice before impairment of engine performance takes place. By deicing sufficiently to clear a proper area of the perforations continuously, a constant indication of the correct icing condition will be possible. This is true particularly for all air velocities that may be encountered, which is a critical factor in accurately detecting or determining icing conditions.

The operation of the system will be apparent. When in flight, the air velocity will, due to the difference in the perforated areas 10 and 12, create an impact pressure in probe 5, which in turn expands diaphragm 8. When a predetermined expansion occurs, pressure differential switch 15 opens and is held open until the formation of ice on probe 5 covers its perforated area 10. The immediate drop in impact pressure causes diaphragm 8 to contract and close switch 15. Current immediately flows from supply terminal 42 through control relay 23 to switch 15 to ground. Contacts 38 and 39 are closed and current then flows through wires 44 and 46, thermal element 48, its contact 53, wire 54, and the coil of cycling relay 52. The energization of cycling relay 52 closes three circuits, to wit: the circuit of primary coil 25 of transformer 26 and hence the heating circuit of probe 5, a holding circuit for cycling relay 52 so that any immediate melting of ice on probe 5 sufficient to uncover enough of the perforated area 10 to produce an impact pressure operating switch 15 will not open the heating circuit of probe 5 immediately by de-energizing the cycling relay, and finally, the time delay heating circuit including resistance 50. By holding the time delay circuit closes a predetermined period of time by means of resistance heater 50 and thermal element 48, the heating circuit of probe 5 will be kept closed a predetermined period and thereafter held open a predetermined period before it can again be closed. Hence, there will always be a predetermined period of deicing occurring on each cycling of the system. It has been found through actual operation that this ratio may be two seconds of deicing to eight seconds for recycling to assure that there will be a deicing of probe 5 that will prevent an accumulation building up. Indications will therefore be provided sufficiently in advance of engine performance impairment to allow corrective measures to be taken manually or automatically to prevent loss of engine performance below anti-icing specifications.

As soon as a predetermined heat is generated by current flow through resistance 50, the thermal element 48 will flex away from contact 53 and open the circuit to cycling relay 52. The immediate de-energizing of cycling relay 52 opens the transformer circuit and, of course, the heating circuit it controls at probe 5. It also opens the indicator circuit. If the ice has not melted at probe 5, the absence of impact pressure will hold differential pressure switch 15 closed. The system will then recycle itself and this will be noted by the pilot by the functioning of the indicator. Continued on and off functioning over any period of time will show that an icing condition continues to exist at the probe, and this in itself will constitute a warning that corrective measures must be taken.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for detecting the formation of ice or the like comprising a chamber having a flexible portion, a lead wall and a trailing wall, said walls having perforated areas, said lead wall having a greater perforated area than said trailing wall, a switch adapted to be held in open position by said flexible portion when the latter is held in an expanded position by pressure in said chamber, said flexible portion being moved to contracted position to close said switch upon a drop in pressure in said chamber, the pressure in said chamber being decreased by the formation of ice upon the perforated area of said lead wall, a control circuit actuated by said switch, and an electrical heating circuit including the walls of said chamber, said electrical heating circuit being closed by said control circuit when said switch is closed.

2. Apparatus for detecting the formation of ice or the like comprising a perforated chamber having a lead wall and a trailing wall and having a flexible portion, there being a greater perforated area in the lead wall than in the trailing wall of said chamber, a switch adapted to be held in open position by said flexible portion when the latter is held in an expanded position by the pressure in said chamber, said flexible portion being moved to contracted position to close said switch upon a drop in pressure in said perforated chamber, the pressure in said perforated chamber being decreased by the formation of ice upon the perforated area of said lead wall, means to heat said perforated chamber, and means to operate said heating means, said operating means being actuated by the closing of said switch.

3. Apparatus for detecting the formation of ice upon a vehicle or the like comprising a chamber having a flexible portion, a lead wall and a trailing wall, said walls having perforated areas, said lead wall having a greater perforated area than that of said trailing wall, said perforated area of said lead wall being exposed to the air flow past said vehicle to produce an impact pressure in said chamber whereby to expand said flexible portion, the formation of ice on said perforated area of said lead wall lowering said impact pressure in said chamber and causing said flexible portion to contract, a switch adapted to be actuated by the flexing of said flexible portion, and heating means controlled by said switch to melt the ice formation on said perforated area of said lead wall upon a lowering of the impact pressure in said chamber.

4. Apparatus for detecting the formation of ice upon a travelling vehicle or the like comprising a chamber having a flexible portion and a lead wall and a trailing wall, said lead wall being exposed to the air flow past said vehicle and to ice that may form upon said vehicle, said walls having perforated areas, one of said walls having a greater perforated area than the other wall to create an impact pressure within said chamber when said lead surface is exposed to the air flow past said vehicle, means for heating the lead wall upon formation of ice upon its perforated areas, and means for operating said heating means, said operating means being operable by a drop of said impact pressure in said chamber when ice forms upon the perforated area of said lead wall.

5. Apparatus for detecting the formation of ice upon a travelling vehicle or the like comprising a chamber including a lead wall and a trailing wall, said walls having perforated areas, one of said walls having a greater perforated area than the other wall to create an impact pressure within said chamber when said lead surface is exposed to the air flow past said vehicle, and means for heating the lead wall upon a drop in impact pressure in said chamber caused by the formation of ice upon the perforated area of said lead wall.

6. Apparatus for detecting the formation of ice upon a travelling vehicle or the like comprising a chamber including a lead wall exposed to the air flow past the vehicle and to ice that may form upon said vehicle, said chamber also including a trailing wall, said walls having perforated areas, one of said walls having a greater perforated area than the other wall to create an impact pressure within said chamber by the air flow past said vehicle, the formation of ice on said lead wall causing a drop in impact pressure in said chamber, and heating means operable upon a drop of impact pressure to melt said ice formation.

7. Apparatus for detecting the formation of ice upon a travelling vehicle or the like comprising a chamber including a lead wall exposed to the air flow past the vehicle and to the ice that may form upon said vehicle, said chamber also including a trailing wall, said walls having perforated areas, said lead wall having a greater perforated area than the trailing wall to create an impact pressure within said chamber by the air flow past said vehicle, the formation of ice on said lead wall causing a drop in impact pressure in said chamber, means for melting the ice formed upon said lead surface, and means operable by the lowering of said impact pressure to operate said first means.

8. Apparatus for detecting the formation of ice upon a travelling vehicle or the like comprising a probe exposed to the air flow past the vehicle and to the ice that may form upon said vehicle, a flexible enclosure communicating with said probe, a closed housing to protect said flexible enclosure from said air flow, the lead and trailing walls having perforated areas subject to said air flow and ice formation to create in said probe an impact pressure by the air flow whereby to expand said flexible enclosure, the formation of ice upon said lead wall dropping the impact pressure in said probe whereby to contract said flexible enclosure, heating means to melt the ice formation on said probe, and control means operated by the expansion and contraction of said flexible enclosure for controlling said heating means.

9. Apparatus for detecting the formation of ice upon a travelling vehicle or the like comprising a probe exposed to the air flow past the vehicle and to the ice that may form upon said vehicle, and means for removing the ice that forms on said probe, said means comprising an expansible enclosure communicating with said probe, a closed housing encasing said expansible enclosure so that the exterior of the latter is exposed to static pressure, said probe having means to create an impact pressure in said probe and in said expansible enclosure to expand the latter, heating means for said probe, and control means for said heating means de-energized by the expansion of said expansible enclosure, the formation of ice on said probe lowering the pressure in said probe to contract said expansible element and to energize said heating means.

10. Apparatus for detecting the formation of ice upon a travelling vehicle or the like comprising a probe exposed to the air flow past the vehicle and to the ice that may form upon the vehicle, and means for removing the ice that forms on said probe, said means comprising an expansible enclosure communicating with said probe, a closed housing encasing said expansible enclosure so that the exterior of the latter is exposed to static pressure, said probe having means to create an impact pressure in said probe to expand said expansible enclosure and to hold the same expanded, means to dispose of the ice on said probe, and control means for said ice-disposing means, said control means being de-energized by the expansion of said expansible enclosure, the formation of ice on said probe lowering the pressure in said probe to contract said expansible element and to energize said last ice-disposing means.

11. Apparatus for detecting the formation of ice upon a travelling vehicle or the like comprising a probe exposed to the air flow past the vehicle and to the ice that may form upon the vehicle, means establishing an impact pressure within said probe by said air flow and to cause said impact pressure to fail within said probe upon formation of ice thereon, means to remove the ice formation upon failure of said impact pressure in said probe, and means to energize said ice-removing means periodically for a predetermined period of time upon each energization as long as the failure of said impact pressure in said probe continues.

12. Apparatus for detecting the formation of ice upon a travelling vehicle or the like comprising a probe exposed to the air flow past the vehicle and to the ice that may form upon the vehicle, means establishing an impact pressure within said probe by said air flow and to cause said impact pressure to fail within said probe upon formation of ice thereon, means to remove the ice formation upon failure of said impact pressure in said probe, and means to hold said ice-removing means operative for a predetermined period of time upon said failure of said impact pressure.

13. Apparatus for detecting the formation of ice upon a travelling vehicle or the like comprising a probe exposed to the air flow past the vehicle and to the ice that may form upon the vehicle, means establishing an impact pressure within said probe by said air flow and to cause said impact pressure to fail within said probe upon formation of ice thereon, a pressure responsive switch adapted to be actuated to "on" and "off" positions by the pressure in said probe, a control circuit in which said switch is disposed, a heating circuit to heat said probe by the current flow through said heating circuit, and a recycling circuit including means to hold said heating circuit closed for a predetermined period of time each time it is energized.

14. Apparatus for detecting the formation of ice upon a travelling vehicle or the like comprising a probe exposed to the air flow past the vehicle and to the ice that may form upon the vehicle, means establishing an impact pressure within said probe by said air flow and to cause said impact pressure to fail within said probe upon formation of ice thereon, a pressure responsive switch adapted to be actuated to "on" and "off" positions by the pressure in said probe, a control circuit in which said switch is disposed, a heating circuit to heat said probe by the current flow through said heating circuit, and a recycling circuit including means to hold said heating circuit closed and thereafter to hold said heating circuit opened alternately for predetermined periods of time each time said heating circuit is energized.

15. Apparatus for detecting the formation of ice upon a travelling vehicle or the like comprising a probe exposed to the air flow past the vehicle and to the air that may form upon the vehicle, means establishing an impact pressure within said probe by said air flow and to cause said impact pressure to fail within said probe upon formation of ice thereon, a pressure responsive switch adapted to be actuated to "on" and "off" positions by the pressure in said probe, a control circuit in which said switch is disposed, a heating circuit to heat said probe by the current flow through said heating circuit, and a recycling circuit adapted to be energized by said control circuit, said recycling circuit including holding means for said control circuit and thermal circuit-breaking means controlled by the flow of current through said recycling circuit, said recycling circuit energizing said heating circuit upon failure of said impact pressure in said probe, said holding means keeping said recycling circuit and said heating circuit closed until opened by said thermal means.

References Cited in the file of this patent

UNITED STATES PATENTS

| | | |
|---|---|---|
| 2,229,740 | Helmore | Jan. 28, 1941 |
| 2,460,165 | Britton | Jan. 25, 1949 |
| 2,541,512 | Hahn | Feb. 13, 1951 |
| 2,566,813 | Thorsen | Sept. 4, 1951 |
| 2,624,825 | Crowley | Jan. 6, 1953 |
| 2,675,456 | Cleminson et al. | Apr. 13, 1954 |
| 2,711,453 | Leigh | June 21, 1955 |

FOREIGN PATENTS

| | | |
|---|---|---|
| 446,983 | Great Britain | May 11, 1936 |